US 12,105,780 B2

(12) United States Patent
Park et al.

(10) Patent No.: US 12,105,780 B2
(45) Date of Patent: Oct. 1, 2024

(54) ELECTRONIC APPARATUS AND CONTROL METHOD THEREOF

(71) Applicant: SAMSUNG ELECTRONICS CO., LTD., Suwon-si (KR)

(72) Inventors: Yosub Park, Suwon-si (KR); Sejin Kwak, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 263 days.

(21) Appl. No.: 17/067,152

(22) Filed: Oct. 9, 2020

(65) Prior Publication Data
US 2021/0112037 A1 Apr. 15, 2021

(30) Foreign Application Priority Data

Oct. 11, 2019 (KR) .................. 10-2019-0126312

(51) Int. Cl.
G06F 21/32 (2013.01)
G06F 18/214 (2023.01)
(Continued)

(52) U.S. Cl.
CPC ....... *G06F 21/32* (2013.01); *G06Q 20/40145* (2013.01); *G06V 10/764* (2022.01);
(Continued)

(58) Field of Classification Search
CPC ...... G06N 20/00; G06V 40/172; G06V 40/50; G06K 9/6256; G06Q 20/40145
See application file for complete search history.

(56) References Cited

U.S. PATENT DOCUMENTS

2005/0222712 A1 10/2005 Orita
2008/0319296 A1* 12/2008 Bernstein ............. A61B 5/1495
600/365
(Continued)

FOREIGN PATENT DOCUMENTS

JP 7-296077 A 11/1995
JP 2003-162771 A 6/2003
(Continued)

OTHER PUBLICATIONS

Communication dated Jul. 19, 2023 issued by the European Patent Office in counterpart European Application No. 20874546.3.
(Continued)

Primary Examiner — Shin-Hon (Eric) Chen
Assistant Examiner — Thomas A Carnes
(74) Attorney, Agent, or Firm — Sughrue Mion, PLLC

(57) ABSTRACT

An electronic apparatus and a method of controlling the same are provided. The electronic apparatus includes a camera configured to capture an image, a communication interface, a memory configured to store at least one instruction, and a processor configured to obtain characteristics information of a user based on the image; based on the characteristics information of the user being obtained, identify whether first information corresponding to the characteristics information is stored in the memory; based on the corresponding first information not being stored in the memory, generate identification information corresponding to the characteristics information of the user, perform mapping of the characteristics information and the identification information of the user and store in the memory; and transmit the characteristics information and the identification information of the user to a second electronic apparatus.

14 Claims, 13 Drawing Sheets

(51) Int. Cl.
  *G06Q 20/40* (2012.01)
  *G06V 10/764* (2022.01)
  *G06V 10/82* (2022.01)
  *G06V 40/10* (2022.01)
  *G06V 40/16* (2022.01)
  *G06V 40/50* (2022.01)
  *H04L 9/40* (2022.01)

(52) U.S. Cl.
  CPC ............ *G06V 10/82* (2022.01); *G06V 40/103* (2022.01); *G06V 40/172* (2022.01); *H04L 63/0861* (2013.01); *G06F 18/214* (2023.01); *G06V 40/50* (2022.01)

(56) References Cited

U.S. PATENT DOCUMENTS

| | | | |
|---|---|---|---|
| 2014/0316915 | A1 | 10/2014 | Hickey et al. |
| 2015/0137937 | A1 | 5/2015 | Smith et al. |
| 2016/0125240 | A1* | 5/2016 | Danikhno ........... H04N 21/4126 348/78 |
| 2016/0136817 | A1 | 5/2016 | Fouillade et al. |
| 2016/0189149 | A1* | 6/2016 | MacLaurin ...... G06Q 20/40145 705/44 |
| 2017/0255941 | A1* | 9/2017 | Chandrasekaran .......................... G06Q 20/40145 |
| 2018/0039745 | A1* | 2/2018 | Chevalier .............. G16H 30/40 |
| 2018/0136615 | A1* | 5/2018 | Kim ...................... G06N 3/08 |
| 2018/0300468 | A1 | 10/2018 | Lui et al. |
| 2018/0311822 | A1 | 11/2018 | Kaminka et al. |
| 2019/0108566 | A1* | 4/2019 | Coleman ............ G06Q 30/0633 |
| 2019/0266344 | A1 | 8/2019 | Contolini et al. |
| 2020/0412133 | A1* | 12/2020 | Baldasare ............ G06V 40/172 |
| 2021/0354305 | A1* | 11/2021 | Kim ...................... B25J 13/003 |

FOREIGN PATENT DOCUMENTS

| | | |
|---|---|---|
| JP | 2005-293052 A | 10/2005 |
| JP | 5040186 B2 | 10/2012 |
| JP | 2017-010179 A | 1/2017 |
| KR | 10-2010-0110143 A | 10/2010 |
| KR | 10-2015-0140556 A | 12/2015 |
| KR | 10-2019-0092337 A | 8/2019 |

OTHER PUBLICATIONS

Communication issued Jul. 4, 2022 by the European Patent Office in European Patent Application No. 20874546.3.

International Search Report (PCT/ISA/210) issued Jan. 11, 2021 in counterpart International Patent Application No. PCT/KR2020/013668.

Written Opinion (PCT/ISA/237) issued Jan. 11, 2021 in counterpart International Patent Application No. PCT/KR2020/013668.

* cited by examiner

| Age | Height | Sex | Order 1 | Order 2 |
|-----|--------|-----|---------|---------|
| 20s | 160 | Female | Steak | well done |

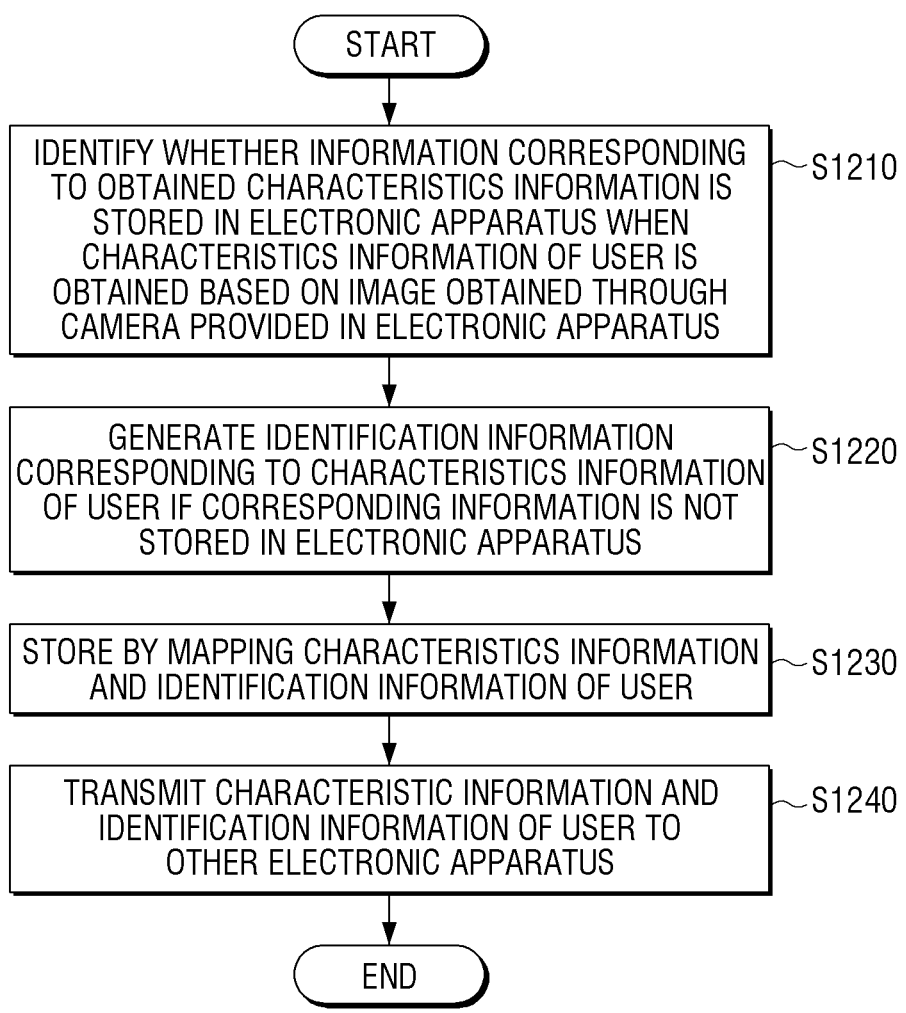

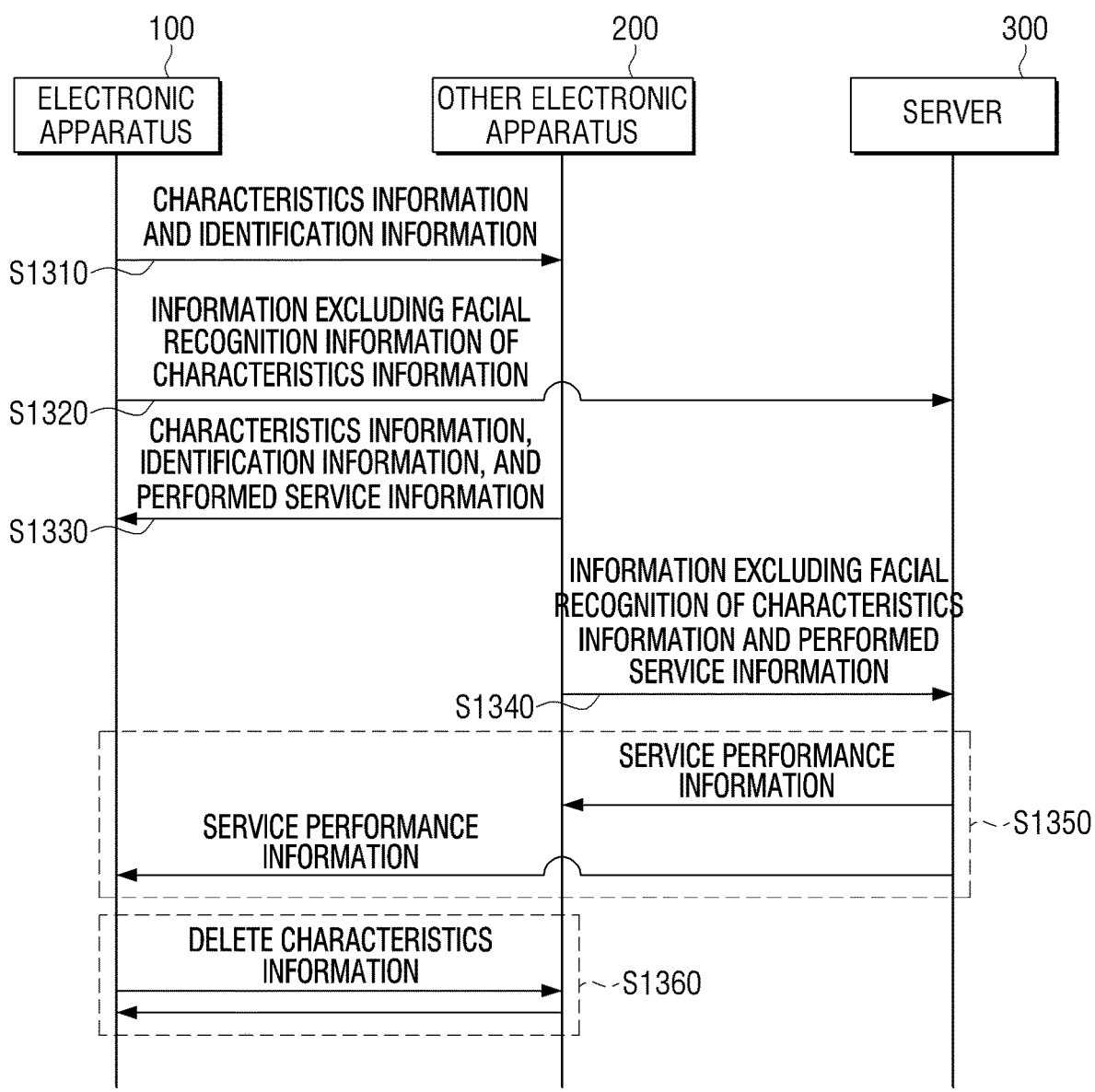

ELECTRONIC APPARATUS AND CONTROL METHOD THEREOF

CROSS-REFERENCE TO RELATED APPLICATION

This application is based on and claims priority under 35 U.S.C. § 119 to Korean Patent Application No. 10-2019-0126312, filed on Oct. 11, 2019, in the Korean Intellectual Property Office, the disclosure of which is incorporated by reference herein in its entirety.

BACKGROUND

1. Field

The disclosure relates to an electronic apparatus and a control method thereof, and more specifically, to an electronic apparatus for providing service to a user and a control method thereof.

2. Description of Related Art

With recent developments in electronic technologies, electronic apparatuses of various types are being developed and distributed.

In particular, electronic apparatuses such as a kiosk or robot, which substitutes humans are actively being supplied to shops, cafes, restaurants, and the like. The electronic apparatus such as the above may process an order for a customer, or perform an operation such as delivery to a customer.

Currently, while many electronic apparatuses such as a kiosk or a robot merely replace simple human labor, there is a growing need for automation to provide a consistent customer service or customized service by utilizing and sharing customer related information.

Conventionally, in order to provide consistent service or a customized service for customers, sensitive personal information had to be managed. Accordingly, there have been a growing concern over information leakage and hacking of personal information of customers.

SUMMARY

According to an embodiment, there is provided an electronic apparatus, including: a camera configured to capture an image; a communication interface; a memory configured to store at least one instruction; and a processor. The processor is configured to: obtain characteristics information of a user based on the image; based on the characteristics information of the user being obtained, identify whether first information corresponding to the characteristics information is stored in the memory; based on the corresponding first information not being stored in the memory, generate identification information corresponding to the characteristics information of the user, perform mapping of the characteristics information and the identification information of the user and store in the memory; and control the communication interface to transmit the characteristics information and the identification information of the user to a second electronic apparatus, wherein the electronic apparatus and the second electronic apparatus are located in a specific space, and each of the electronic apparatus and the second electronic apparatus is configured to perform at least one of services provided in the specific space.

The processor is further configured to: based on the corresponding first information being stored in the memory, obtain the identification information of the user mapped in the corresponding first information from the memory, and perform the at least one of the services based on the obtained identification information.

The processor is further configured to, based on the at least one of the services being performed, control the communication interface to transmit, to a server, second information excluding facial recognition information from among the characteristics information related to the at least one of the services.

The processor is further configured to, based on the at least one of the services being performed, control the communication interface to transmit the first information related to service performed and the characteristics information to the second electronic apparatus through a peer to peer (P2P) communication, wherein the characteristics information includes facial recognition information of the user.

The processor is further configured to control the communication interface to transmit second information excluding facial recognition information from among the characteristics information to a server, receive, from the server, service performance information with respect to the second information, and provide recommended service information based on the received service performance information.

The processor is further configured to, based on one from among a plurality of service information included in the recommended service information being selected by the user, provide additional service information on the selected recommended service information, and based on one from among a plurality of additional service information being selected by the user, control the communication interface to transmit, to the server, a request to update the additional service information with respect to the recommended service information.

The processor is further configured to store, in the memory, the identification information and the characteristics information of the user received from the second electronic apparatus through the communication interface.

The processor is further configured to: based on respective characteristics information of a plurality of users being obtained from the image, generate respective identification information corresponding to each of the respective characteristics information of the plurality of users, and generate group identification information by grouping a plurality of identification information, generate group characteristics information based on at least one of the respective characteristics information of the plurality of users, and control the communication interface to transmit the respective identification information of the each of the plurality of users, the respective characteristics information, the group identification information and the group characteristics information to the second electronic apparatus.

The processor is further configured to, based on the at least one of the services being performed, control the communication interface to transmit, to the server, the first information related to the at least one of the services performed and the group characteristics information.

The processor is further configured to, based on identifying at least one of a predetermined time passing, a predetermined period passing, or the user leaving the specific space after obtaining the characteristics information, delete the characteristics information and the identification information of the user from the memory.

The memory is configured to store a learning network model trained to obtain the characteristics information of the user based on an input image, and the processor is further configured to obtain the characteristics information of the user by inputting the image to the learning network model.

At least one of the electronic apparatus or the second electronic apparatus is a moving robot that moves within the specific space.

According to an embodiment, there is provided a control method of an electronic apparatus, the method including: obtaining characteristics information of a user based on an image captured by a camera of the electronic device; based on the characteristics information of the user being obtained, identifying whether first information corresponding to the characteristics information is stored in the electronic apparatus; based on the corresponding first information not being stored in the electronic apparatus, generating identification information corresponding to the characteristics information of the user; mapping and storing the characteristics information and the identification information of the user; and transmitting the characteristics information and the identification information of the user to a second electronic apparatus, wherein the electronic apparatus and the second electronic apparatus are located within a specific space, and each of the electronic apparatus and the second electronic apparatus performs at least one of services provided in the specific space.

The method further includes: based on the corresponding first information being stored in the electronic apparatus, obtaining the identification information of the user mapped in the corresponding first information from the electronic apparatus; and performing the at least one of the services based on the obtained identification information.

The method further includes: based on the at least one of the services being performed, transmitting, to a server, second information excluding facial recognition information from among the characteristics information related to the at least one of the services.

The method further includes: based on the at least one of the services being performed, transmitting the first information related to service performed and the characteristics information to the second electronic apparatus through a peer to peer (P2P) communication, wherein the characteristics information includes a facial recognition information of the user.

The method further includes: transmitting second information excluding facial recognition information from among the characteristics information to a server; receiving, from the server, service performance information related to the second information; and providing recommended service information based on the received service performance information.

The method further includes: based on one of a plurality of service information included in the recommended service information being selected by the user, provide additional service information on the selected recommended service information, and based on one of a plurality of additional service information being selected by the user, transmitting, to the server, a request to update the additional service information on the recommended service information.

The method further includes: storing the identification information and the characteristics information of the user received from the second electronic apparatus in the electronic apparatus.

The method further includes: based on respective characteristics information of a plurality of users being obtained from the image, generating respective identification information corresponding to each of the respective characteristics information of the plurality of users; generating group identification information by grouping a plurality of identification information; generating group characteristics information based on at least one of the respective characteristics information of the plurality of users; and transmitting the respective identification information of each of the plurality of users, the respective characteristics information, the group identification information, and the group characteristics information to the second electronic apparatus.

According to various embodiments, a consistent and customized service may be provided to a customer by using an electronic apparatus which effectively maintains and manages sensitive personal information of a customer while minimizing leaking and hacking risks.

Additional aspects will be set forth in part in the description which follows, and in part, will be apparent from the description, or may be learned by practice of the presented embodiments.

BRIEF DESCRIPTION OF THE DRAWINGS

The above and other aspects, features and advantages of certain embodiments will become more apparent from the following detailed description, taken in conjunction with the accompanying drawings, in which:

FIG. 12 is a flowchart illustrating a control method of an electronic apparatus according to an embodiment; and FIG. 13 is a sequence diagram illustrating operations of an electronic apparatus, another electronic apparatus, and a server according to an embodiment.

DETAILED DESCRIPTION

Figure 1:
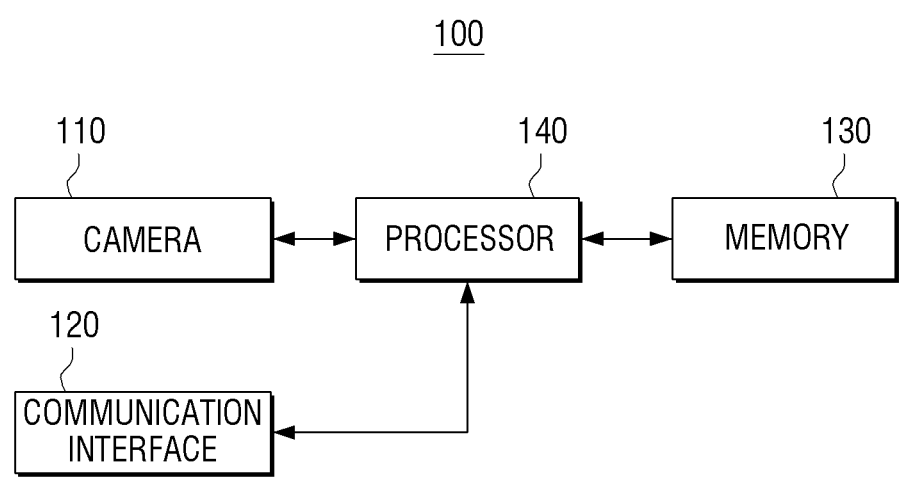
FIG. 1 is a block diagram illustrating a configuration of an electronic apparatus according to an embodiment.

The terms used herein will be briefly described, and the disclosure will be described in greater detail below.

The terms and words used in the following description and claims are not limited to the bibliographical meanings, but, are merely used to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

Embodiments of the disclosure may be variously modified and may include various embodiments therefrom. Some of the embodiments and detailed descriptions thereof are provided to assist in the comprehensive understanding of the disclosure. However, it should be noted that the various embodiments are not intended to limit the scope of the disclosure to a specific embodiment, but should be interpreted to include all modifications, combinations, equivalents and/or alternatives of the embodiments. In describing the embodiments, in case it is determined that the detailed description of related or known technologies may unnecessarily confuse the gist of the disclosure, the detailed description thereof will be omitted.

The terms such as "first" and "second" may be used to describe various elements, but the elements may not be limited by the terms. The terms may be used only for the purpose of distinguishing one element from another element.

A singular expression may include a plural expression, unless clearly indicated otherwise in the context. It is to be understood that the terms such as "comprise" or "consist of" are used herein to designate a presence of a characteristic, number, step, operation, element, component, or a combination thereof, and not to preclude a presence or a possibility of adding one or more of other characteristics, numbers, steps, operations, elements, components or a combination thereof.

In the disclosure, terms such as "module" or "part" may be used to perform at least one function or operation, and may be implemented as hardware or software, or a combination of hardware and software. Further, a plurality of "modules" or a plurality of "parts" except for when the "modules" or "parts" need to be implemented in a specific hardware, may be integrated to at least one module to be implemented as at least one processor.

Embodiments of the disclosure have been described in detail with reference to the accompanying drawings to aid in the understanding of those of ordinary skill in the art. However, the disclosure may be realized in various different forms and it should be noted that the disclosure is not limited to the various embodiments described herein. Further, in the drawings, parts not relevant to the description may be omitted, and like reference numerals may be used to indicate like elements.

FIG. 1 is a block diagram illustrating a configuration of an electronic apparatus according to an embodiment.

As illustrated in FIG. 1, the electronic apparatus 100 according to an embodiment may be implemented in a device of various forms such as, for example, and without limitation, a user terminal apparatus, a display apparatus, a set-top box, a tablet personal computer (PC), a smart phone, an e-book reader, a desktop PC, a laptop PC, a workstation, a server, a personal digital assistant (PDA), a portable multimedia player (PMP), an MP3 player, a kiosk, or the like. However, the electronic apparatus 100 is not limited thereto and may be implemented as an electronic apparatus of various forms such as, for example, and without limitation, a wearable apparatus corresponding to at least one type of an accessory type (e.g., a watch, a ring, a bracelet, an anklet, a necklace, a pair of glasses, a contact lens or a head-mounted-device (HMD)) or a fabric or a garment-embedded type (e.g., an electronic clothing), a robot including a driving part, a projector, a server, and the like.

The electronic apparatus 100 according to an embodiment may be implemented as a robot. The robot may refer to a machine of various forms with abilities to perform a function on its own. In an example, the robot may refer to a smart machine which, in addition to performing simple repetitive functions, detects the surrounding environment in real-time based on a sensor, a camera, or the like, collects information, and operates autonomously.

The robot may include a driving part which includes an actuator or a motor. The robot may use the driving part to control a movement of an articulated robot. The driving part may include a wheel, a brake, and the like, and the robot may use the driving part to be implemented as a moving robot capable of moving on its own in a specific space. In addition, the articulated robot may refer to a component of the robot for substituting a function of a human arm or a human hand.

The robot may be classified for commercial use, for medical use, for home use, for military use, for exploration use, and the like based on the field or performable function. For example, a commercial use robot may be further classified as a robot used in a factory product manufacturing process, a robot performing customer reception, receiving orders, serving, and the like in a shop or a restaurant, or the like. However, these are only some examples, and the robot may be variously classified according to the field of use, function and purpose, and the embodiment may not be limited to the above-described examples.

For convenience of description, the electronic apparatus 100 is assumed as a robot and described below.

As illustrated in FIG. 1, the electronic apparatus 100 may include a camera 110, a communication interface 120, a memory 130, and a processor 140.

The camera 110 is configured to photograph or capture a still image or a moving image. The camera 110 may photograph a still image at a specific point in time, but may also photograph a still image consecutively. The camera 110 may provide the obtained image to the processor 140.

The camera 110 may obtain an image which includes a face of a user according to a control of the processor 140. For example, the processor 140 may, if the user is identified as being located adjacent to the electronic apparatus 100, control the camera 110 to move in a direction toward the user to obtain an image including the face of the user.

According to an embodiment, there may be a plurality of cameras 110. For example, the plurality of cameras 110 may include a front surface camera and a back surface camera.

The communication interface 120 may receive input of contents of various types. For example, the communication interface 120 may receive an image signal from an external apparatus (e.g., source device), an external storage medium (e.g., Universal Serial Bus (USB) memory), an external server (e.g., Cloud server), or the like through streaming or downloading using a communication network, such as, and without limitation, an access point (AP) based Wi-Fi (e.g., Wi-Fi, wireless LAN network), Bluetooth, ZigBee, a wired/wireless local area network (LAN), a wide area network (WAN), Ethernet, IEEE 1394, a high-definition multimedia interface (HDMI), a USB, a mobile high-definition link (MHL), Audio Engineering Society/European Broadcasting Union (AES/EBU), Optical, Coaxial, or the like. The image signal may be a digital image signal of any one of a standard definition (SD) image, a high definition (HD) image, a full HD image, or an ultra HD image, but the embodiment is not limited thereto.

The electronic apparatus 100 may share information by performing communication with the other electronic apparatus in a peer to peer (P2P) form through the communication interface 120. In an example, the electronic apparatus 100 may perform communication with the other electronic apparatus in an Ad Hoc mode, which transmits or receives information between apparatus in a P2P form without an access point (AP). A detailed description thereof will be provided below with reference to FIG. 2.

Figure 2:
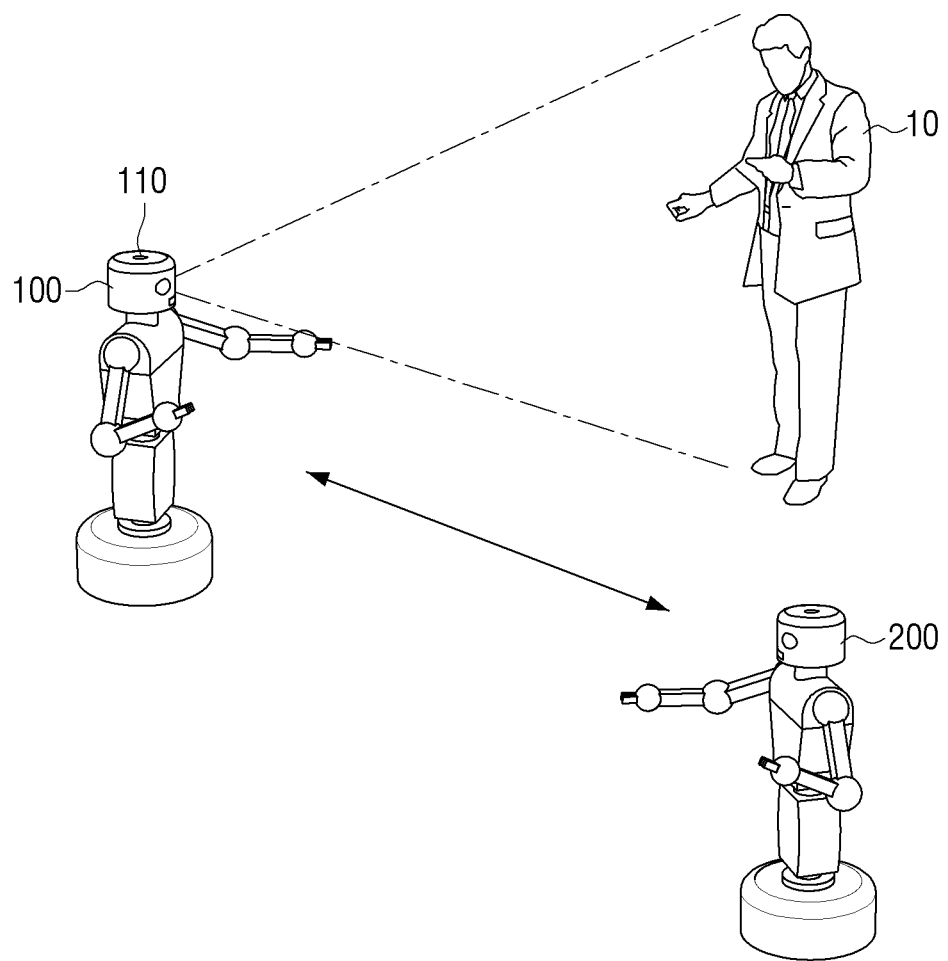
FIG. 2 is a diagram illustrating a schematic configuration of an electronic apparatus and another electronic apparatus according to an embodiment.

FIG. 2 is a diagram illustrating a schematic configuration of the electronic apparatus and the other electronic apparatus according to an embodiment.

Referring to FIG. 2, the electronic apparatus 100 may obtain information on a user 10. The electronic apparatus 100 may then transmit the obtained information to the other electronic apparatus 200. The information on the user 10 may include characteristics information of the user 10 obtained based on an image, which includes the face of the user photographed through the camera 110. For example, the characteristics information of the user 10 may include characteristics such as, face, sex, age group, body shape, speech, or the like of the user 10.

In another example, the electronic apparatus 100 may also receive information of the user 10 from the other electronic apparatus 200. For example, the other electronic apparatus 200 may obtain information on the user 10, and transmit the obtained information to the electronic apparatus 100.

As illustrated in FIG. 2, the electronic apparatus 100 and the other electronic apparatus 200 may share information of the user 10 with each other. The detailed description on the sharing of information of the user 10 will be described below.

The electronic apparatus 100 and the other electronic apparatus 200 illustrated in FIG. 2 may be located within a specific space and may be apparatuses that perform at least some of the services provided to the user 10 in the specific space. For example, the specific space may include a shop, a restaurant, or the like, and each of the electronic apparatus 100 and the other electronic apparatus 200 may perform at least some of the services such as receiving orders, serving, customer reception, or payment which are provided in shops, restaurants, or the like. The user 10 may refer to a user or a customer of a shop or restaurant, but will be collectively referred to as the user 10 herein below for convenience of description.

Referring back to FIG. 1, the memory 130 may be implemented as an internal memory such as a read-only memory (ROM) (e.g., electrically erasable programmable read-only memory (EEPROM)) and a random-access memory (RAM) or a memory separate from the processor 140. The memory 130 may be implemented as a memory form embedded in the electronic apparatus 100 according to a data storage use, or as a memory form attachable/detachable to the electronic apparatus 100. For example, the data for the driving of the electronic apparatus 100 may be stored in a memory embedded to the electronic apparatus 100, and data for an expansion function of the electronic apparatus 100 may be stored in a memory attachable/detachable to the electronic apparatus 100. The memory embedded in the electronic apparatus 100 may be implemented as at least one of a volatile memory (e.g., a dynamic RAM (DRAM), a static RAM (SRAM), or a synchronous dynamic RAM (SDRAM)), or a non-volatile memory (e.g., one time programmable ROM (OTPROM), programmable ROM (PROM), erasable and programmable ROM (EPROM), electrically erasable and programmable ROM (EEPROM), mask ROM, flash ROM, a flash memory (e.g., NAND flash or NOR flash), a hard disk drive (HDD) or a solid state drive (SSD)). In the case of a memory being attachable/detachable to the electronic apparatus 100, the memory may be implemented in a form such as a memory card (e.g., a compact flash (CF), a secure digital (SD), a micro secure digital (micro-SD), a mini secure digital (mini-SD), an extreme digital (xD), a multimedia card (MMC), etc.), or an external memory (e.g., USB memory) connectable to a USB port, or the like.

The memory 130 may, based on the control of the processor 140, store information of the user 10 obtained based on an image or information on the user 10 received from the other electronic apparatus 200. For example, the information on the user 10 may include characteristics information, identification information, and the like.

In addition, the memory 130 may store a trained learning network model to obtain the characteristics information of the user 10 based on an image. The learning network model may be an artificial intelligence (AI) model which has machine learned based on a plurality of sample images.

The function related to the artificial intelligence according to an embodiment may be operated through the processor and the memory. The processor may be comprised of one or a plurality of processors. The one or plurality of processor may be a general use processor such as a CPU, an AP, or a digital signal processor (DSP), a graphics dedicated processor such as a GPU or a vision processing unit (VPU), or an artificial intelligence dedicated processor such as an NPU. The one or plurality of processors may control for the input data to be processed according to a pre-defined operation or artificial intelligence model stored in the memory. Alternatively, if the one or plurality of processors is an artificial intelligence dedicated processor, the artificial intelligence dedicated processor may be designed as a hardware structure specializing in the processing of a specific artificial intelligence model.

The pre-defined operation rule or the artificial intelligence model may be generated through machine learning. The pre-defined operation rule or the artificial intelligence model being created through learning to perform a desired feature may be trained by a learning algorithm using learning data. The learning may be carried out in the machine itself in which the artificial intelligence is performed, or carried out through a separate server and/or system. Examples of the learning algorithm may include a supervised learning, a unsupervised learning, a semi-supervised learning, or a reinforcement learning, but the embodiment is not limited thereto.

The artificial intelligence model may include a plurality of neural network layers. Each of the plurality of neural network layers may include a plurality of weight values, and may perform neural network processing through processing between the processing results of a previous layer and the plurality of weight values. The plurality of weight values in the respective plurality of neural network layers may be optimized by the learning result of the artificial intelligence model. For example, the plurality of weight values may be updated for a loss value or a cost value obtained by the artificial intelligence model during the learning process to be reduced or optimized. The artificial neural network may include a Deep Neural Network (DNN), and examples thereof may include a Convolutional Neural Network (CNN), a Deep Neural Network (DNN), a Recurrent Neural Network (RNN), a Restricted Boltzmann Machine (RBM), a Deep Belief Network (DBN), a Bidirectional Recurrent Deep Neural Network (BRDNN), a Deep-Q Networks, or the like, but the embodiment is not limited to the above-described examples.

The learning network model may obtain characteristics information of the user 10 from an image based on the control of the processor 140.

The processor 140 may control the overall operation of the electronic apparatus 100.

According to an embodiment, the processor 140 may be implemented as a digital signal processor (DSP) which processes digital image signals, a microprocessor, an artificial intelligence (AI) processor, and a timing controller (T-CON). However, the embodiment is not limited thereto, and the processor 140 may include one or more of a central processing unit (CPU), a micro controller unit (MCU), a micro processing unit (MPU), a controller, an application processor (AP), a communication processor (CP), or an Advanced RISC Machine (ARM) processor, or may be defined by the corresponding term. In addition, the processor 140 may be implemented as a system on chip (SoC) having a built-in processing algorithm and as a large scale integration (LSI), or in a field programmable gate array (FPGA) form.

The processor 140 may obtain the characteristics information of the user 10 based on an image obtained through the camera 110. The detailed description thereof will be provided below with reference to FIG. 3.

Figure 3:
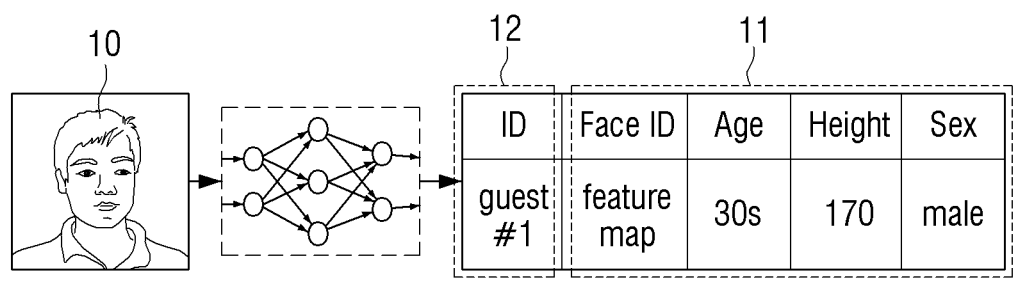
FIG. 3 is a diagram illustrating characteristics information and identification information of a user according to an embodiment.

FIG. 3 is a diagram illustrating characteristics information and identification information according to an embodiment.

Referring to FIG. 3, the processor 140 may obtain the characteristics information 11 of the user 10 by inputting the image including the user 10 to a learning network model stored in the memory 130. The image including the user 10 is not limited to an image including the face of the user 10, but may also be an image including the entire body of the user 10 or a partially captured image of the user.

The characteristics information 11 of the user 10 may refer to information of all types capable of specifying the user 10. For example, the characteristics information 11 of the user 10 may include a facial recognition information (e.g., Face ID), a sex information, an age group information, a body type information (e.g., height) of the user, or information on the clothing worn by the user 10, and the like. As illustrated in FIG. 3, the facial recognition information (e.g., Face ID), age group, height, and sex as the characteristics information 11 of the user 10 is merely one example, and the characteristics information 11 may include information of various types which may specify the user 10. For example, the characteristics information 11 may include voice information (e.g., sound), finger print information, and the like of the user 10. In addition, the characteristics information 11 may also include the time at which the user 10 entered a specific space (e.g., time of entry in shop), and the time of departure (e.g., time of departure from shop).

The processor 140 may identify whether the characteristics information 11 of the user obtained based on an image is stored in the memory 130. The processor 140 may, if information corresponding to the characteristics information 11 is not stored in the memory 130, generate an identification information 12 corresponding to the characteristics information 11 of the user 10. Referring to FIG. 3, the identification information 12 indicating the user 10 may be Guest #1. The form of the identification information 12 illustrated in FIG. 3 is merely one example, and is not necessarily limited thereto. For example, the processor 140 may generate IDs of various forms capable of indicating the user 10 and the characteristics information 11 of the user 10.

The processor 140 may perform mapping of the characteristics information 11 of the user 10 and the identification information 12 of the user and store in the memory 130. The processor 140 may then control the communication interface 120 to transmit the characteristics information 11 and the identification information 12 to the other electronic apparatus 200.

The processor may, based on information corresponding to the characteristics information 11 obtained based on an image being stored in the memory, obtain the identification information 12 of the user mapped in the corresponding information from the memory 130. In an example, the processor 140 may identify the characteristics information 11 based on a predetermined threshold value relating to a similarity with the plurality of characteristics information 11 stored in the memory 130. Specifically, for example, the processor 140 may identify a facial recognition information from among the characteristics information 11 obtained based on an image. That is, based on an image captured by the camera 110 and received by the processor 140, the processor 140 may identify the characteristics information 11 of the image by comparing the image with each of the plurality of characteristics information 11 stored in the memory 130, and determining that the image corresponds to one of the plurality of characteristics information 11 based on a predetermined threshold value. In another example, the processor 140 may add different weight values to each of the facial recognition information, age group information, body type information or sex information included in the characteristics information 11, and then identify the characteristics information 11 with a similarity of a predetermined threshold value or more of the plurality of characteristics information stored in the memory 130. According to an embodiment, the processor 140 may also add a relatively high weight value to the facial recognition information over the remaining information (e.g., age group information, body type information, or sex information).

The processor 140 may obtain the identification information 12 mapped in the identified characteristics information 11. For example, the processor 140 may obtain information corresponding to the characteristics information 11 of the user 10 among the plurality of characteristics information 11 stored in the memory 130, and obtain the identification information 12 mapped in the obtained information. Referring to FIG. 3, the processor 140 may, based on information corresponding to the characteristics information 11 obtained based on an image being pre-stored in the memory 130, load the identification information 12 mapped in the pre-stored characteristics information 11 rather than generating the identification information 12 for indicating the user 10 and the obtained characteristics information 11.

The processor 140 may control the electronic apparatus 100 to perform at least some of the services provided in a specific space based on the obtained identification information. The detailed description thereof will be provided below with reference to FIG. 4.

Figure 4:
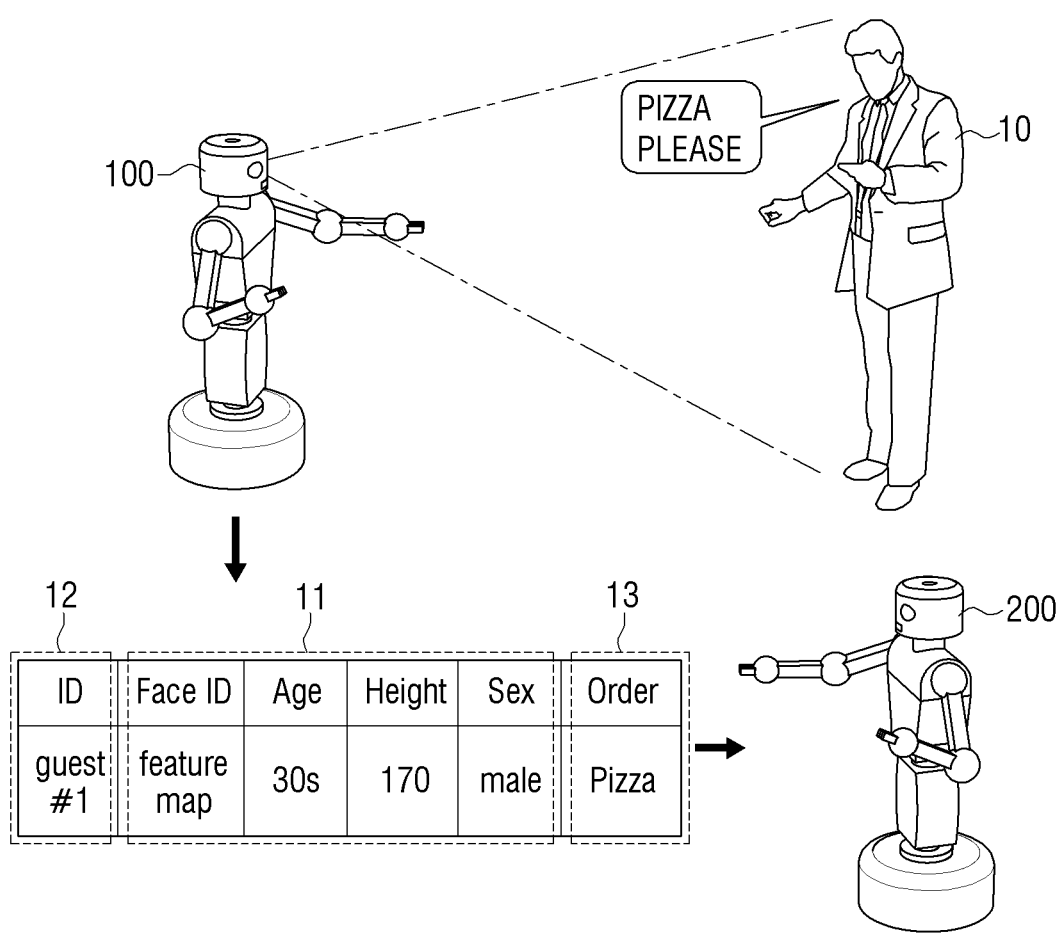
FIG. 4 is a diagram illustrating a service which is provided in a specific space according to an embodiment.

FIG. 4 is a diagram illustrating the service which is provided in the specific space according to an embodiment.

Referring to FIG. 4, the specific space according to an embodiment may be a shop or a restaurant, and the electronic apparatus 100 may be a robot which receives an order history of the user 10 and transmits to the other electronic apparatus 200. In this case, the processor 140 may, in addition to the characteristics information 11 and identification information 12 of the user 10, transmit the order history received from the user 10 to the other electronic apparatus 200.

For example, as illustrated in FIG. 4, the electronic apparatus 100 may transmit the order history (e.g., "Pizza please.") of the user 10 together with the characteristics information 11 and identification information 12 of the user to the other electronic apparatus 200. The processor 140 may also transmit information on the time at which the order history is received from the user 10 to the other electronic apparatus 200.

The order history received from the user 10 is shown in information 13 (e.g., "Pizza") related to a service performed by the electronic apparatus 100.

That is, the processor 140 may perform a specific service according to the field of use, function, purpose of use, and the like of the electronic apparatus 100, and may transmit the information 13 related to service performed to the other electronic apparatus 200 together with the characteristics information 11 and the identification information 12 of the user 10.

In another example, the electronic apparatus 100 may be disposed in the shop, and may receive an order from the user 10, perform payment transaction, serve food, and the like. In this case, the processor 140 may obtain information on whether or not payment has been made, payment amount, whether or not serving of food is necessary, seating location of the user to serve food, or the like as information 13 related to the service performed.

In still another example, the electronic apparatus 100 may obtain an utterance history of the user 10 including other requests by the user 10, such as, whether the corresponding requests have been resolved or not, or the like as the information 13 related to service performed.

According to an embodiment, the other electronic apparatus 200 may be an apparatus for receiving the order history of the user 10, and the electronic apparatus 100 may be an apparatus for serving cooked food according to the order history of the user 10. In this case, the electronic apparatus 100 may obtain the characteristics information 11 of the user 10 based on an image obtained through the camera 110. The electronic apparatus 100 may then, based the obtained characteristics information 11 being identified as corresponding to the characteristics information received from the other electronic apparatus 200, perform serving based on the information 13 related to the service received from the other electronic apparatus 200. The information 13 related to service may be information generated in the other electronic apparatus 200, and may include information on the order of the user 10, the seating location of the user 10, and the like.

Furthermore, the processor 140 may control the communication interface 120 to transmit the information excluding the facial recognition information of the characteristics information of the user 10 and the information 13 related to performed service to a server. The detailed description thereof will be provided below with reference to FIG. 5.

Figure 5:
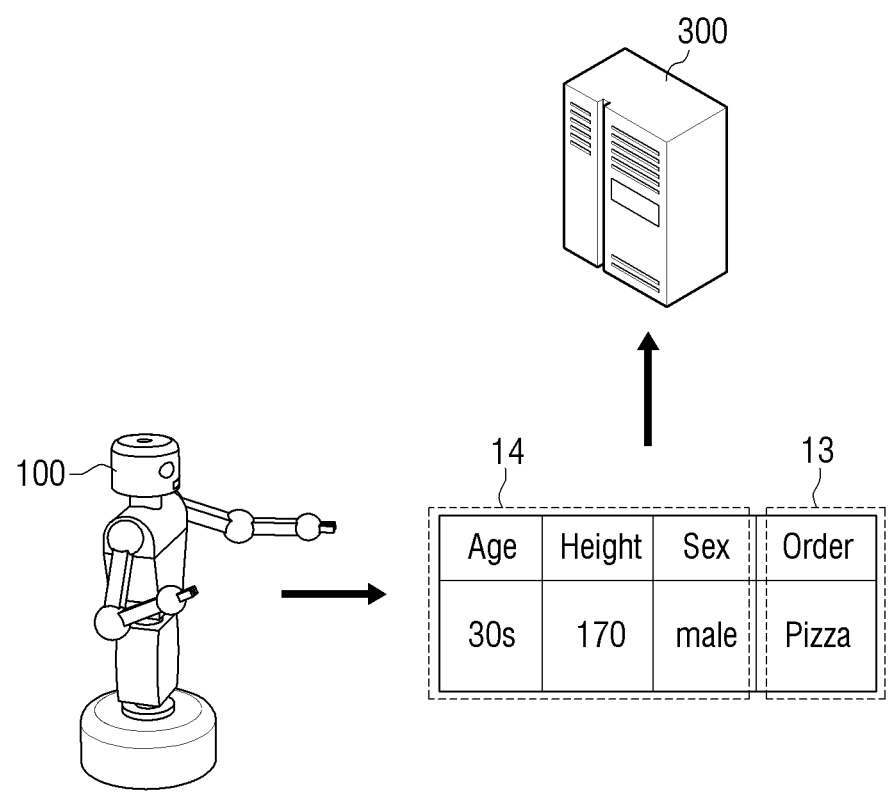
FIG. 5 is a diagram illustrating information which is transmitted to a server according to an embodiment.

FIG. 5 is a diagram illustrating the information which is transmitted to a server according to an embodiment.

Referring to FIG. 5, the processor 140 may transmit information excluding facial recognition information (e.g., Face ID) 14 from among the characteristics information 11 and information 13 related to service performed to a server 300. The facial recognition information may be information obtained from an image of the user 10 captured by the camera 110. The facial recognition information, and the finger print, voice, iris recognition information, and the like, are personal information of the user corresponding to biometric information. However, if sensitive personal information of the user 10 is to be stored or maintained without user 10 consent, there may be security problems involved in terms of maintaining and securing such personal information.

Accordingly, the processor 140 according to an embodiment may transmit only the remaining information 14 excluding the facial recognition information, the iris recognition information, or the like corresponding to personal information from among the characteristics information 11 to the server 300. For convenience of description, personal information unique to the user 10 and biometric information will be collectively referred to as facial recognition information.

As illustrated in FIG. 5, the electronic apparatus 100 may maintain only the age group information, the body type information, the sex information, or the like, excluding sensitive personal information, of the characteristics information of the user 10 and transmit such personal information to the server 300. In addition, the electronic apparatus 100 may transmit the information excluding facial recognition information 14 of the characteristics information and the information 13 related to service performed to the server 300.

In FIG. 5, the information 13 related to service has been described as information obtained from the order history (e.g., "Pizza please.") of the user 10, but the information 13 related to service is not limited to the order history or request history, and may also include an utterance history of the user 10, and a use history related to the electronic apparatus 100. For example, the processor 140 may determine the intent of the user 10 based on an utterance voice of the user 10 by using at least one algorithm of a speech to text (STT) engine for converting the utterance voice of the user 10 to a string or a natural language processing (NLP) engine for obtaining the intent information of the natural language, and may identify the obtained intent information as the information 13 related to service performed.

As described above, the processor 140 according to an embodiment may transmit the information excluding facial recognition information 14 from among the characteristics information 11 of the user to the server 300. The processor 140 may then receive service performance information related to the transmitted information 14. The detailed description thereof will be provided below with reference to FIG. 6.

Figure 6:
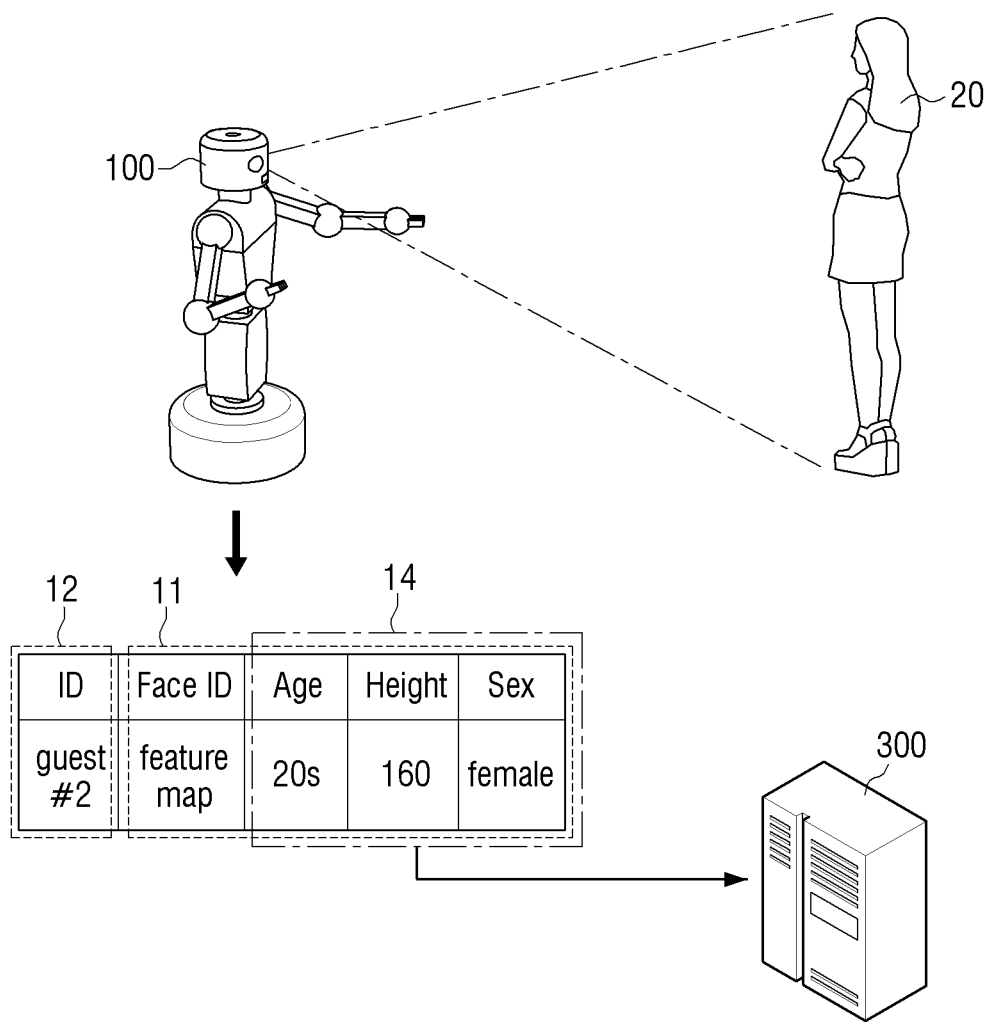
FIG. 6 is a diagram illustrating information which is transmitted to a server according to an embodiment.

FIG. 6 is a diagram illustrating the information which is transmitted to the server according to an embodiment.

The processor 140 according to an embodiment may, based on obtaining the characteristics information 11 of the user 20 based on an image of the user 20, identify whether the information corresponding to the obtained characteristics information 11 is stored in the memory 130. The processor 140 may, based on the corresponding information being pre-stored in the memory 130, obtain the identification information 12 mapped in the corresponding information. The processor 140 may add the identification information 12 to the obtained characteristics information 11 as long as information corresponding to the obtained characteristics information 11 is not stored on the memory 130. In other words, rather than adding new identification information 12 to the corresponding characteristics information 11 each time the characteristics information 11 of a user 20 is obtained, if the identification information 12 already stored in the memory 130 can be identified based on the characteristics information 11, the processor 140 may omit the process of generating and adding the new identification information to the characteristics information 11.

Referring to FIG. 6, if the information corresponding to the obtained characteristics information 11 is stored in the memory 130, the processor 140 may obtain identification information 12 (e.g., Guest #2) indicating the user 20 and the characteristics information of the user 20 from the memory 130.

The processor 140 may then transmit the information excluding facial recognition information 14 from among the characteristics information 11 to the server 300, and receive the service performance information related to the transmitted information 14.

Figure 7:
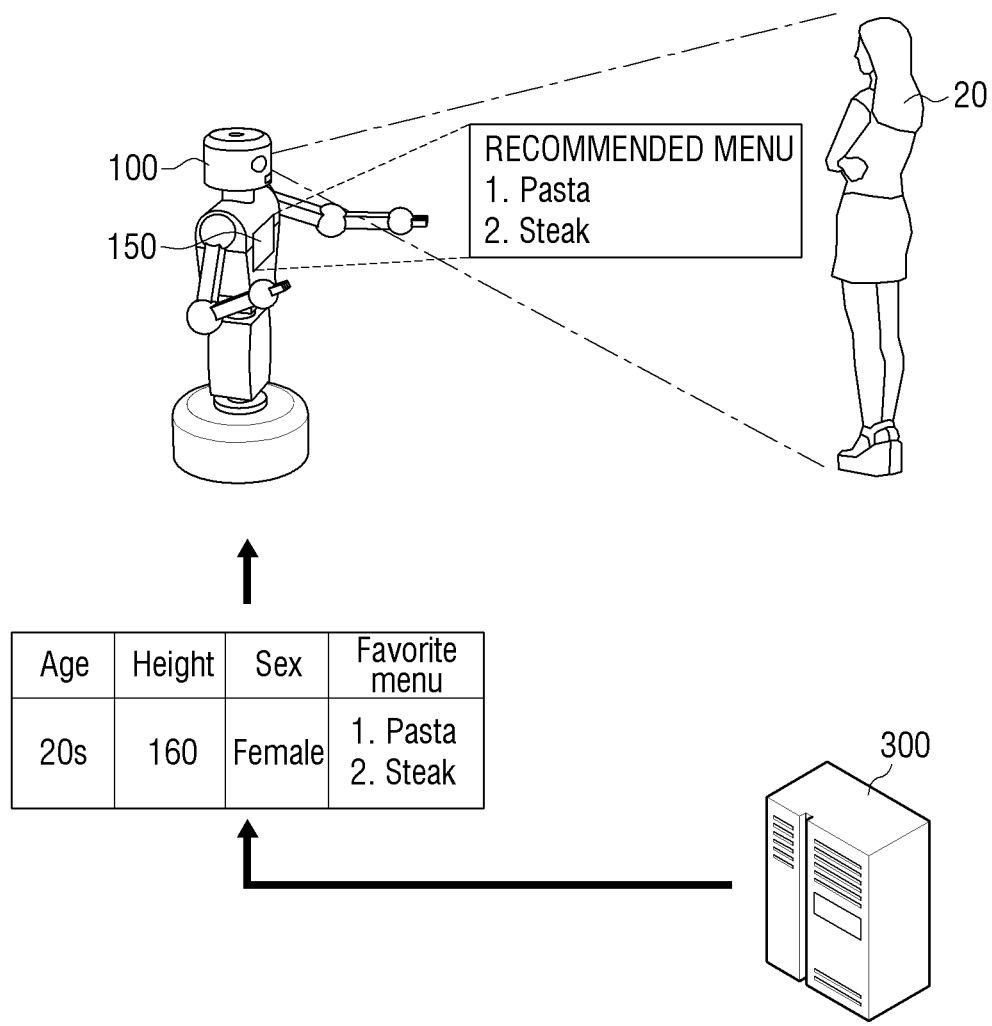
FIG. 7 is a diagram illustrating a recommended service information according to an embodiment.

FIG. 7 is a diagram illustrating the recommended service information according to an embodiment. The detailed description thereof will be provided below with reference to FIG. 7.

Referring to FIGS. 6 and 7, the processor 140 may transmit information excluding facial recognition information 14 of the characteristics information 11, for example, at least one of the age group information, the body type information, or the sex information to the server 300, and receive the service performance information related to the transmitted information 14.

According to an embodiment, the server 300 may receive the information 13 related to service performed from a plurality of apparatuses such as the electronic apparatus 100 and the other electronic apparatus 200. For example, the processor 140 may transmit the age group information and the information 13 related to services performed for the user 20 corresponding to the age group information to the server 300. In addition, the other electronic apparatus 200 may also transmit the age group information and the information 13 related to services performed for the user 20 corresponding to the age group information to the server 300. For example, the server 300 may receive 'twenties' as the age group information and 'Pasta' as the information 13 related to service performed, and 'thirties' as the age group information and 'Steak' as the information 13 related to service performed from the electronic apparatus 100 and the other electronic apparatus 200, respectively.

The server 300 may then identify only the information including the information 14 corresponding to the information transmitted from the electronic apparatus 100 among a plurality of information 13 related to service performed. For example, the server 300 may, based on receiving the age group information 'twenties,' obtain 'Pasta' as the service performance information related to the received age group information and transmit to the electronic apparatus 100.

The electronic apparatus 100 may, if the user 20 is in their 'twenties' based on the characteristics information 11 of the user 20, provide a recommended service information to the user 20 based on the service performance information received from the server 300. For example, the electronic apparatus 100 may provide 'Pasta' as the recommended service information to the user 20 in their 'twenties.'

For convenience of description, a case of considering only the age group information has been described, but the embodiment is not limited thereto. For example, as illustrated in FIG. 6, the processor 140 may transmit the age group information, the body type information, and the sex information as information excluding facial recognition information 14 from among the characteristics information 11 of the user 20 to the server 300, and receive the service information performed to the users corresponding to the information 14 transmitted from the server 300. For example, the processor 140 may transmit 'twenties,' 'height 160 cm,' and 'female' to the server 300 based on the characteristics information of the user 20, and receive the service information performed to the users corresponding to the 'twenties,' 'height 160 cm,' and 'female' from the server 300.

The processor 140 may also provide a plurality of recommended service information based on the service performance information received from the server 300. The processor 140 according to an embodiment may add different order of priorities to each of a plurality of recommended services based on a performance frequency of services performed to the users that correspond to the 'twenties,' 'height 160 cm,' and 'female.'

As illustrated in FIG. 7, the processor 140 may provide a plurality of recommended service information based on the order of priority. For example, the processor 140 may provide 'Pasta' as a primary choice and 'Steak' as a secondary choice in the recommended service information based on the service performance information related to the 'twenties,' 'height 160 cm,' and 'female' received from the server 300.

The electronic apparatus 100 according to an embodiment may include a display 150, and may control the display 150 to display the recommended service information. However, the embodiment is not limited thereto, and the electronic apparatus 100 may also provide the recommended service information in an audio signal by using an outputter such as a speaker. The display 150 may be implemented as a display of various forms such as, and without limitation, a liquid crystal display (LCD), an organic light emitting diodes (OLED) display, a plasma display panel (PDP), or the like. In the display 150, a driving circuit capable of being implemented in a form such as, and without limitation, an amorphous silicon (A-Si) TFT, a lower temperature poly silicon (LTPS) TFT, an organic TFT (OTFT), or the like, a back-light unit, and the like may be included therewith. The display 150 may be implemented as a touch screen coupled with a touch sensor, a flexible display, a 3D display, or the like.

In addition, according to an embodiment, the display 150 may not only include a display panel which outputs images, but also a bezel which houses the display panel. According to an embodiment, the bezel may include a touch sensor 150 for detecting user interaction.

The processor 140 may, based on a user 20 input on any one of the recommended service information being received, transmit an order history according to the characteristics information of the user 20, the identification information, and the user 20 input to the other electronic apparatus 200.

In addition, the processor 140 may transmit information 14 excluding facial recognition information from among the characteristics information 11 of the user 20 and the order history based on the user 20 input to the server 300.

Furthermore, the processor 140 may, based on one of the plurality of service information included in the recommended service information being selected and/or additional service information to the selected recommended service information being selected by the user 20, control the communication interface 120 to transmit, to the server 300, a request to update the additional service information on the selected recommended service information. The detailed description thereof will be provided below with reference to FIG. 8.

Figure 8:
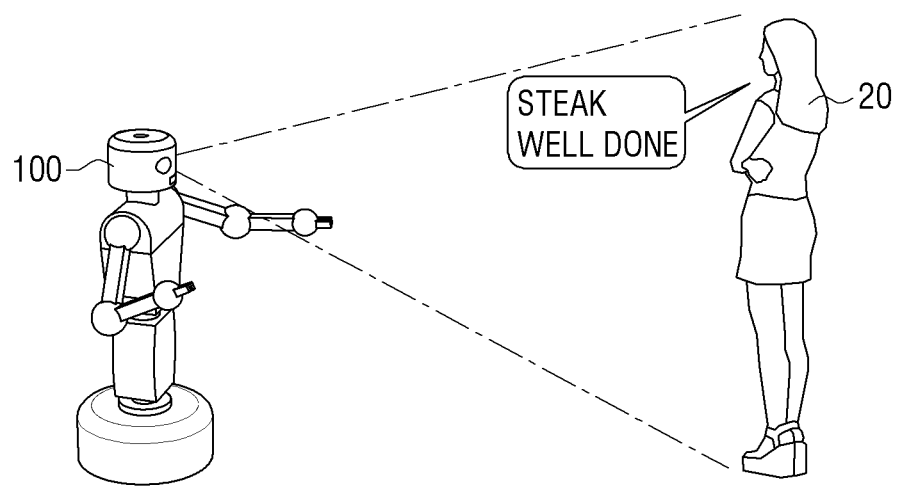
FIG. 8 is a diagram illustrating an additional service information according to an embodiment.

FIG. 8 is a diagram illustrating the additional service information according to an embodiment.

Referring to FIG. 8, the processor 140 according to an embodiment may provide the recommended service information, and transmit to the server 300 by updating the recommended service information based on the input of the user 20 therefrom.

In an example, the processor 140 may provide the plurality of recommended service information based on the service performance information received from the server 300. Then, when one of the plurality of recommended service information is selected by the user 20, the processor 140 may transmit the recommended service information selected by the user 20 to the server 300. Referring to FIG. 8, if 'Steak' is selected by the user 20 among the plurality of recommended service information 'Pasta' and 'Steak,' the processor 140 may transmit the information 14 excluding the facial recognition information from among the characteristics information 11 of the user 20 and 'Steak' selected by the user 20 to the server 300. In this case, with the performance frequency of service on 'Steak' increasing, 'Steak' may be recommended as a primary choice and 'Pasta' as a secondary choice to the user thereafter. Here, for example, the performance frequency may be a count of selecting a specific order by the user 20 (e.g., 'Steak') based on the recommended service information being provided to the user 20. However, the performance frequency is not limited thereto and may be determined in various ways.

In addition, the processor 140 may transmit the characteristics information 11 of the user 20, the identification information 12, and the selected recommended service information to the other electronic apparatus 200. The other electronic apparatus 200 may be a robot cook, a robot server, a robot cashier, or the like placed in the shop.

According to an embodiment, the robot cook may perform cooking of an order based on the information received from the electronic apparatus 100, and the robot server may perform serving to the user 20 based on the seating location in a specific space included in the characteristics information of the user 20.

In another example, the processor 140 may, based on the user 20 selecting an additional service information on the service information selected by the user 20, update the additional service information with respect to the selected service information and transmit to the server 300. For example, the processor 140 may, based on an additional (or, specific) request on the selected service information being identified, update the corresponding request with respect to the selected service information and transmit to the server 300. Referring to FIG. 8, if the service information selected by the user 20 is 'Steak' and a 'degree of cooking' which is the additional service information on the corresponding service information is selected, the processor 140 may perform mapping of the information excluding facial recognition information 14 from among the characteristics information 11 of the user 20, the selected service information, and the additional service information, and transmit to the server 300.

The processor 140 according to an embodiment may, based on obtaining the characteristics information of a plurality of users based on the obtained image, generate an identification information corresponding to each of the characteristics information of the plurality of users, and generate a group identification information by grouping the generated plurality of identification information. The processor 140 may then generate a group characteristics information based on at least some characteristics information from among the characteristics information of a plurality of users, and control the communication interface to transmit the identification information and the characteristics information of each of the plurality of users, the group identification information and the group characteristics information to the other electronic apparatus. The detailed description thereof will be provided below with reference to FIG. 9.

Figure 9:
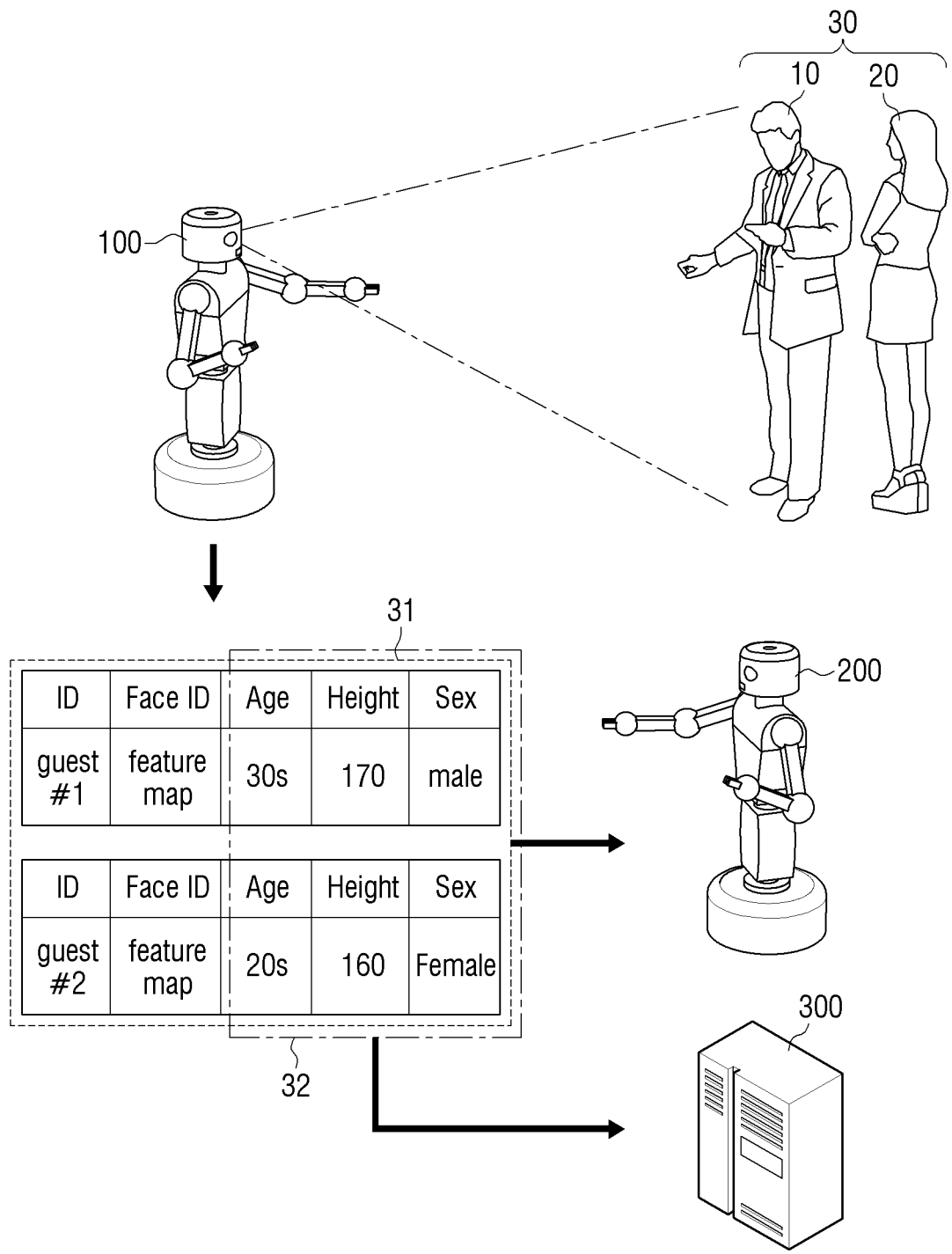
FIG. 9 is a diagram illustrating a group identification information and a group characteristics information according to an embodiment.

FIG. 9 is a diagram illustrating the group identification information and the group characteristics information according to an embodiment.

Referring to FIG. 9, the processor 140 may, based on the characteristics information of a plurality of users 10 and 20 being obtained based on one or more images obtained through the camera 110, generate an identification information corresponding to each of the characteristics information of the plurality of users 10 and 20. In an example, the processor 140 may generate first identification information indicating the characteristics information of a first user 10, and generate second identification information indicating the characteristics information of a second user 20. The processor 140 may then generate group identification information 30 by grouping the plurality of identification information.

In an example, the processor 140 may, based on identifying that a plurality of users 10 and 20 has entered a specific space at the same time or within a predetermined time difference based on the obtained image, generate group identification information 30 by grouping the identification information corresponding to each of the plurality of users 10 and 20. For example, if the first user 10 and the second user 20 are identified as having entered the shop together based on the obtained image, the processor 140 may generate the group identification information 30 by grouping the first user 10 with the second user 20 to provide service as a group unit.

The processor 140 may then generate a group characteristics information 31 based on at least some characteristics information from among the characteristics information of the plurality of users 10 and 20. For example, the processor 140 may generate the group characteristics information 31 based on the facial recognition information of the first user 10 and the facial recognition information of the second user 20, and may perform mapping of the generated group characteristics information 31 and the group identification information 30. Then, the processor 140 may control the communication interface 120 to transmit the group characteristic information 31 to the other electronic apparatus 200. In this case, the other electronic apparatus 200 may perform grouping of the first user 10 and the second user 20 and provide service as a group unit.

The processor 140 may, based on at least some of the services provided in a specific space being performed to the corresponding group, control the communication interface 120 to transmit the information related to the service performed and the group characteristics information 31 to the server 300.

According to an embodiment, the group characteristics information 31 transmitted to the server 300 may be information excluding facial recognition information. For example, the group characteristics information 31 may include the sex information and the age group information of each of the plurality of users 10 and 20 included in the group.

The processor 140 may, based on the characteristics information of the plurality of users 10 and 20 being identified based on an image, transmit information excluding facial recognition information from among the corresponding characteristics information to the server 300, and receive the performed service information with respect to the corresponding group. For example, the processor 140 may, based on a group of a male and female pair being identified, transmit the sex information to the server 300, and receive information on services most frequently performed on a group of a male and female pair from the server 300. The processor 140 may then provide a recommended service information to the group of a male and female pair based on the information received from the server 300.

Figure 10:
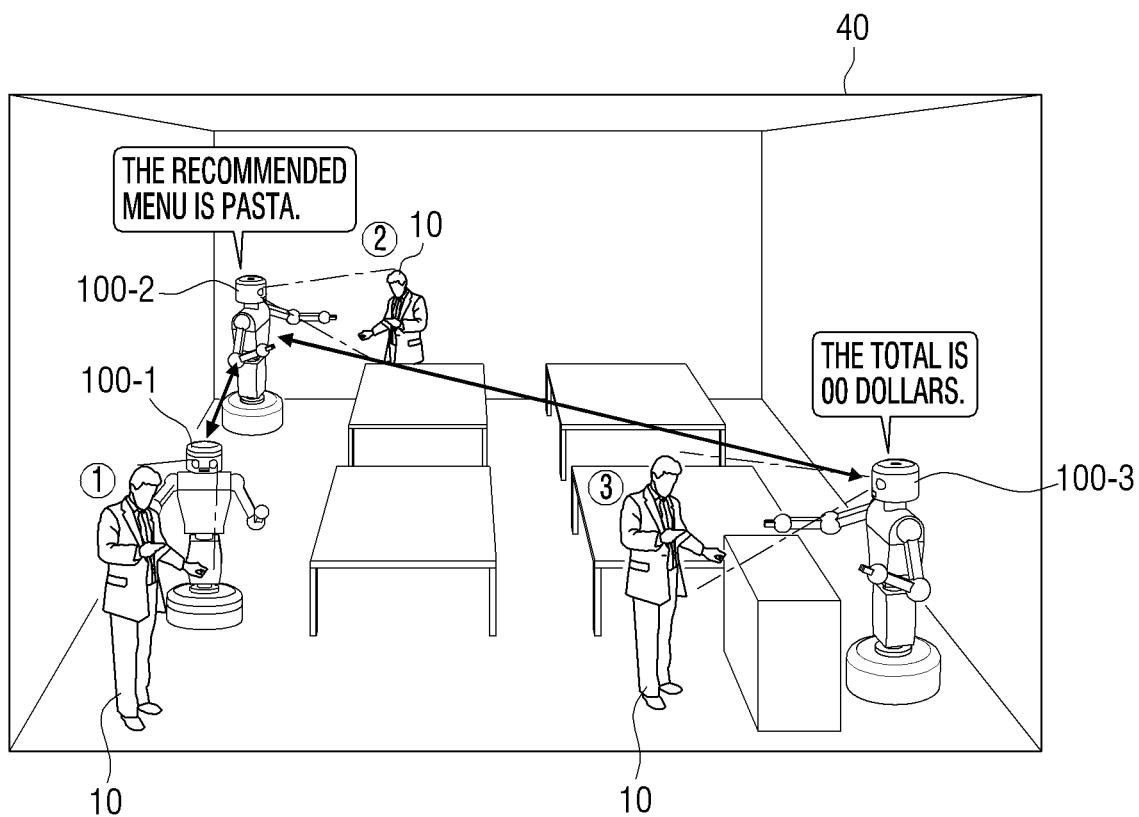
FIG. 10 is a diagram illustrating information which is shared between a plurality of electronic apparatuses according to an embodiment.

FIG. 10 is a diagram illustrating the information which is shared between the plurality of electronic apparatuses according to an embodiment.

Referring to FIG. 10, a plurality of electronic apparatuses 100-1, 100-2 and 100-3 may be disposed in a specific space according to an embodiment. For convenience of description, the specific space has been described as a restaurant, but the embodiment is not necessarily limited thereto. For example, the specific space may refer to a shop in which the electronic apparatus 100 identifies a random group of users, and provides service of various forms to the identified users.

The each of the plurality of electronic apparatuses 100-1, 100-2 and 100-3 may be robots performing different functions from one another. For example, a first electronic apparatus 100-1 may be a robot which performs seating the user 10 and receiving an order from the user 10.

The first electronic apparatus 100-1 may obtain the characteristics information 11 of the user 10, and may identify whether information corresponding to the obtained characteristics information is stored in the memory 130.

The first electronic apparatus 100-1 may, if the corresponding information is not stored in the memory 130, generate an identification information 12 (e.g., Guest #1) corresponding to the characteristics information 11 of the user 10. The first electronic apparatus 100-1 may then transmit the characteristics information 11, the identification information 12, the order (or, request), and the seating location of the user 10 to the second electronic apparatus 100-2.

The second electronic apparatus 100-2 may be a cooking robot for cooking food according to the order or a robot server for serving the cooked food. The second electronic apparatus 100-2 may obtain the characteristics information of the user 10 through an independently provided camera, or identify, based on the characteristics information 11 received from the first electronic apparatus 100-1 having a similarity of a predetermined threshold value or more, the user 10 based on the identification information 12 received from the first electronic apparatus 100-1.

The second electronic apparatus 100-2 may serve food to the user 10 based on the location information in the specific space and the order of the user 10. The second electronic apparatus 100-2 may transmit information on whether serving of food was performed to the user 10, whether additional request was made by the user, and the like, together with the characteristics information 11 and the identification information 12 of the user 10 to a third electronic apparatus 100-3.

The third electronic apparatus 100-3 may be a robot which receives a level of satisfaction on the food expressed by the user 10 or performs payment transaction. The third electronic apparatus 100-3 may obtain the characteristics information of the user 10 through an independently provided camera, and if the characteristics information 11 received from the second electronic apparatus 100-2 has a similarity of a predetermined threshold value or more with the independently obtained characteristics information, the third electronic apparatus 100-3 may identify the user 10 based on the identification information 12 received from the second electronic apparatus 100-2. The third electronic apparatus 100-3 according to an embodiment may identify the level of satisfaction of the user 10 based on another image of the user 10. In an example, the learning network model stored in the memory 130 may obtain an emotion, response, level of satisfaction, and the like of the user 10 based on an image. The third electronic apparatus 100-3 may identify the level of satisfaction expressed by the user 10 by applying the image in which the user 10 is photographed during the payment stage of the user 10 to the learning network model. The third electronic apparatus 100-3 may then transmit the service information performed to the user 10, the order history of the user 10, and the level of satisfaction of the user 10 to the server 300. The service performance information transmitted to the third electronic apparatus 100-3 by the server 300 may include a satisfaction result, and the third electronic apparatus 100-3 may not only exclude any one of the plurality of recommended services based on the satisfaction results, but also add a different order of priority between the plurality of recommended services.

The third electronic apparatus 100-3 may perform payment transaction based on the order of the user 10. The third electronic apparatus 100-3 may transmit information excluding facial recognition from among the characteristics information 11 of the user 10, the order of the user 10, the level of satisfaction on the order, and the like to the server 300. Based on the first electronic apparatus 100-1 transmitting information 14 excluding facial recognition information from among the characteristics information 11 of the user 10 to the server 300, the first electronic apparatus 100-1 may thereafter provide the orders of the plurality of users in the same age group, sex and body type as the user 10 as a recommended service information for the user 10.

For convenience of description, the first electronic apparatus 100-1 has been described as transmitting information to the second electronic apparatus 100-2, and the second electronic apparatus 100-2 has been described as transmitting information to the third electronic apparatus 100-3, but the embodiment is not limited thereto. For example, the first electronic apparatus 100-1 may also transmit the obtained characteristics information 11 and the identification information 12 to any one of or a combination of electronic apparatuses located in the specific space. In addition, the plurality of electronic apparatuses 100-1, 100-2 and 100-3 may also share the characteristics information 11, the identification information 12, and the information related to the service performed therebetween.

Since storing and maintaining personal information such as facial recognition information from among the characteristics information of the user 10, biometric information, and the like without user consent may be problematic in terms of security, the electronic apparatus 100 may only share information with the other electronic apparatus 200 through P2P communication, without transmitting to the server 300.

In addition, the electronic apparatus 100 according to an embodiment may delete the characteristics information 11 of the user 10 if a predetermined time has elapsed, or the user 10 leaves the specific space after obtaining the characteristics information 11.

For example, the electronic apparatus 100 may perform communication with a plurality of sensors placed in the shop. The electronic apparatus 100 may, based on identifying that the user 10 has left the shop through the plurality of sensors, delete the characteristics information 11 of the user 10.

In another example, the electronic apparatus 100 may delete the characteristics information 11 of the user 10 from the memory 130 if a predetermined time has passed after having obtained the characteristics information 11 of the user 10. In still another example, the electronic apparatus 100 may also delete the plurality of characteristics information 11 stored in the memory 130 at predetermined period intervals.

In yet still another example, the electronic apparatus 100 may delete only the facial recognition information from among the characteristics information 11 of the user 10, and maintain some biometric information without deleting. For example, the electronic apparatus 100 may obtain voice verification information (e.g., sound band) based on the utterance voice of the user 10, and maintain the voice recognition information of the characteristics information 11 without deleting.

The electronic apparatus 100 may perform mapping of the identification information 12 of the user, the voice recognition information, and the information related to services performed to the user 10, and store and maintain the information. The electronic apparatus 100 may obtain the voice recognition information from among the characteristics information 11 of the user 10, and if the user 10 is identified as a frequent visitor generally visiting the specific space within a specific time period based on the obtained voice recognition information being identified as pre-stored in the memory 130, the electronic apparatus 100 may also provide a recommended service information to the user 10 based on the information related to the service performed to the user 10.

Even if the facial recognition information included in the characteristics information 11 of the user 10 is not transmitted to the server 300, because the storing and maintaining facial recognition information by the electronic apparatus 100 on its own may be problematic in terms of security such as hacking, and the like, the electronic apparatus 100 may delete the characteristics information 11 if a predetermined event occurs. Both the electronic apparatus 100 and the other electronic apparatus 200 placed within a specific space may delete the characteristics information 11 based on whether a predetermined event occurs. For example, the predetermined event may be triggered by an operator of the electronic apparatus 100 manually deleting the characteristics information or automatically setting a predetermined interval (e.g., $1^{st}$ day of the month) as a trigger for the predetermined event to occur and delete the characteristics information. However, the embodiment is not limited thereto. The predetermined event may be any preset event that can trigger the processor 140 to delete the characteristics information 11 stored in the memory 130.

Figure 11:
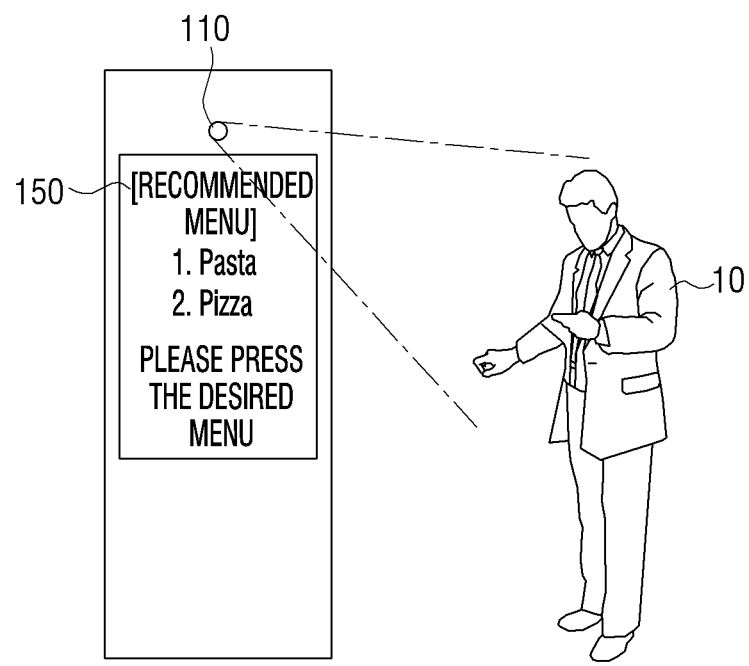
FIG. 11 is a diagram illustrating a schematic configuration of an electronic apparatus according to an embodiment.

FIG. 11 is a diagram illustrating a schematic configuration of the electronic apparatus according to another embodiment.

The electronic apparatus 100 according to an embodiment may also be implemented as a kiosk.

The kiosk, unlike the robot, may not include a driving part, and may be disposed at a fixed location within the specific space. According to an embodiment, the kiosk may obtain the characteristics information 11 of the user through the camera 110, and perform mapping of the identification information 12 corresponding to the characteristics information 11 and transmit to the other electronic apparatus 200 within the specific space. The other electronic apparatus 200 may include a robot including the driving part, an electronic apparatus which performs a specific function according to an order request by the user 10, a robot cashier, and the like.

The electronic apparatus 100 according to an embodiment may transmit information 14 excluding facial recognition information of the characteristics information 11 obtained through the camera 110 to the server 300, and provide a recommended service information based on the service performance information related to the transmitted information 14.

As illustrated in FIG. 11, the electronic apparatus 100 may provide a recommended menu to the user 10, and receive the user 10 input on the recommended menu and transmit to the other electronic apparatus 200.

FIG. 12 is a flowchart illustrating the control method of the electronic apparatus according to an embodiment.

The control method of the electronic apparatus according to an embodiment may include identifying whether characteristics information of a user is stored in the electronic apparatus based on an image of the user obtained through the camera provided in the electronic apparatus (S1210).

Based on determining that the corresponding characteristic information is not stored in the electronic apparatus, identification information may be generated based on the image obtained through the camera of the electronic apparatus (S1220).

Then, mapping of the characteristics information and the identification information of the user is performed and stored (S1230).

Then, the electronic apparatus may transmit the characteristics information and the identification information of the user to the other electronic apparatus (S1240).

The electronic apparatus and the other electronic apparatus may be located within a specific space, and each may perform at least one of the services provided within the specific space.

The control method according to an embodiment may include, based on the corresponding information being stored in the electronic apparatus, obtaining the identification information of the user mapped in the corresponding information from the electronic apparatus and performing at least some of the services based on the obtained identification information.

The control method according to an embodiment may include, based on at least some of the services being performed, transmitting information excluding facial recognition information from among the information related to services performed and the characteristics information to the server.

The control method according to an embodiment may include, based on at least some of the services being performed, transmitting the information related to service performed and the characteristics information to the other electronic apparatus through peer to peer (P2P) communication, and the characteristics information may include the facial recognition information of the user.

The control method according to an embodiment may include transmitting the information excluding facial recognition information from among the obtained characteristics information to the server, receiving the service performance information related to the information transmitted from the server, and providing the recommended service information based on the received service performance information.

In addition, the control method according to an embodiment may include, based on one of the plurality of service information included in the recommended service information being selected by the user, and an additional service information on the selected recommended service information being selected by the user, transmitting, to the server, a request to update the additional service information with respect to the selected recommended service information.

The control method according to an embodiment may include storing the identification information and the characteristics information of the user received from the other electronic apparatus to the electronic apparatus, and the identifying whether the information is stored in the electronic apparatus may include, based on the characteristics information of the user being obtained based on the obtained image, identifying whether the information corresponding to the obtained characteristics information is stored in the electronic apparatus.

The control method according to an embodiment may include, based on the characteristics information of the plurality of users being obtained based on the obtained image, generating an identification information corresponding to each of the characteristics information of the plurality of users, generating a group identification information by grouping the generated plurality of identification information, generating a group characteristics information based on at least some of the characteristics information from among the characteristics information of the plurality of users, and transmitting the identification information of each of the plurality of users and the characteristics information, and the group identification information and the group characteristics information to the other electronic apparatus.

FIG. 13 is a sequence diagram illustrating the operations of the electronic apparatus, the other electronic apparatus, and the server according to an embodiment.

Referring to FIG. 13, the electronic apparatus 100 according to an embodiment may perform mapping of the characteristics information 11 and the identification information 12 of the user 10 and transmit to the other electronic apparatus 200 (S1310). In addition, the electronic apparatus 100 may transmit information 14 excluding facial recognition information from among the characteristics information 11 to the server 300 (S1320).

The other electronic apparatus 200 may identify the user 10 based on the characteristics information 11 and the identification information 12 received from the electronic apparatus 100, and transmit the service information performed to the identified user 10 to the electronic apparatus 100 (S1330).

The other electronic apparatus 200 may transmit information 14 excluding facial recognition information from among the characteristics information 11 and the information on service performed to the server 300 (S1340).

Here, each step performed by the other electronic apparatus 200 may also be performed by the electronic apparatus 100.

In addition, the server 300 according to an embodiment may transmit a service performance information corresponding to the information 14 excluding facial recognition information from among the characteristics information 11 received from the electronic apparatus 100 or the other electronic apparatus 200 (S1350). The electronic apparatus 100 may then provide a recommended service information to the user 10 based on the service performance information received from the server 300.

The electronic apparatus 100 or the other electronic apparatus 200 according to an embodiment may, based on a predetermined event occurring, delete the characteristics information 11 of the user 10 (S1360). For example, the electronic apparatus 100 may, if the user is identified as leaving a specific space, delete the characteristics information 11 of the user 10. In addition, the electronic apparatus 100 according to an embodiment may also transmit a control signal requesting for the characteristics information 11 of the user to be deleted to the other electronic apparatus 200.

The various embodiments described above may be implemented in a recordable medium which is readable by computer or a device similar to computer using software, hardware, or the combination of software and hardware. In some cases, embodiments described herein may be implemented by the processor itself. According to a software implementation, embodiments such as the procedures and functions described herein may be implemented with separate software modules. Each of the above-described software modules may perform one or more of the functions and operations described herein.

In addition, the computer instructions for performing the processing operations in the electronic apparatus 100 according to the various embodiments described above may be stored in a non-transitory computer-readable medium. The computer instructions stored in this non-transitory computer-readable medium may cause the above-described embodiments to be performed by the electronic apparatus 100 when executed by the processor of the electronic apparatus 100.

The non-transitory computer readable medium may refer to a medium that stores data semi-permanently rather than storing data for a very short time, such as a register, a cache, a memory, or the like, and is readable by an apparatus. Specific examples of the non-transitory computer readable medium include, for example, and without limitation, a compact disc (CD), a digital versatile disc (DVD), a hard disc, a Blu-ray disc, a universal serial bus (USB), a memory card, a read only memory (ROM), and the like.

While the disclosure has been illustrated and described with reference to various example embodiments thereof, the disclosure is not limited to the specific embodiments described above. It will be understood by those skilled in the art that various changes in form and details may be made therein without departing from the spirit and scope of the disclosure.

What is claimed is:

1. An electronic apparatus, comprising:
a camera configured to capture an image;
a communication interface;
a memory configured to store at least one instruction; and
a processor configured to:
obtain imaged characteristics information of a user based on the image, wherein the imaged characteristics information comprises a facial recognition information, a sex information, an age group information, a body type information and/or information on clothing worn by the user;
based on the imaged characteristics information of the user being obtained, identify whether first information corresponding to the imaged characteristics information is stored in the memory as identification information;
based on the corresponding first information not being stored in the memory, generate identification information corresponding to the imaged characteristics information of the user;
perform mapping of the imaged characteristics information and the identification information of the user and store the mapping in the memory; and
identify whether a second electronic apparatus is located in a same place as the electronic apparatus,
based on the second electronic apparatus being located in the same place as the electronic apparatus, control the communication interface to transmit a first form of data including the imaged characteristics information, the identification information of the user and information related to at least one of the services requested by the user to the second electronic apparatus, based on the second electronic apparatus being located in a different place as the electronic apparatus, control the communication interface to transmit second information excluding the facial recognition information from among the imaged characteristics information to the second electronic apparatus, and to transmit the information related to the at least one of the requested services to the second electronic apparatus, identify whether a server is located in the same place as the electronic apparatus, based on the server being located in the same place as the electronic apparatus, control the communication interface to transmit the first form of data to the server, based on the server being located in the different place as the electronic apparatus, control the communication interface to transmit the second information to the server, and to transmit the information related to the at least one of the requested services to the server, wherein each of the electronic apparatus and the second electronic apparatus is configured to perform the at least one of the requested services to the user based on the information related to the at least one of the requested services, and wherein the processor is further configured to:

control the communication interface to receive, from the server, service information presented to the user based on the identification information of the user, receive a user input to the service information, and in response to the user input for the service information, present additional service information to the user, the additional service information being related to the user input response to the service information, and receive a second user input to the additional service information, and control the communication interface to transmit, to the server, a request to update the additional service information with respect to the service information based on the second user input and the identification information of the user.

2. The electronic apparatus of claim 1, wherein the processor is further configured to:

based on the corresponding first information being stored in the memory, obtain the identification information of the user mapped in the corresponding first information from the memory, and perform the at least one of the requested services based on the obtained identification information.

3. The electronic apparatus of claim 1, wherein the processor is further configured to, based on the at least one of the requested services being performed, control the communication interface to transmit the first information related to the at least one of the requested services performed to the user and the imaged characteristics information to the second electronic apparatus through a peer to peer (P2P) communication.

4. The electronic apparatus of claim 1, wherein the processor is further configured to receive from the second electronic apparatus the imaged characteristics information and the identification information of the user via the communication interface and store, in the memory, the imaged characteristics information and the identification information of the user.

5. The electronic apparatus of claim 1, wherein the processor is further configured to:

based on respective characteristics information of a plurality of users being obtained from the image, generate respective identification information corresponding to each of the respective characteristics information of the plurality of users, and generate group identification information by grouping a plurality of identification information, generate group characteristics information based on at least one of the respective characteristics information of the plurality of users, and control the communication interface to transmit the respective identification information of the each of the plurality of users, the respective characteristics information, the group identification information and the group characteristics information to the second electronic apparatus.

6. The electronic apparatus of claim 5, wherein the processor is further configured to, based on the at least one of the requested services being performed, control the communication interface to transmit, to the server, the information related to the at least one of the requested services performed and the group characteristics information.

7. The electronic apparatus of claim 1, wherein the processor is further configured to:

based on at least one of identifying at least one of a predetermined time passing or the user leaving the specific space, delete the imaged characteristics information and the identification information of the user from the memory.

8. The electronic apparatus of claim 1, wherein the memory is configured to store a learning network model trained to obtain the imaged characteristics information of the user based on an input image, and wherein the processor is further configured to obtain the imaged characteristics information of the user by inputting the image to the learning network model.

9. The electronic apparatus of claim 1, wherein both of the electronic apparatus and the second electronic apparatus is a moving robot that moves within the specific space.

10. A control method of an electronic apparatus, the method comprising:

obtaining imaged characteristics information of a user based on an image captured by a camera of the electronic apparatus, wherein the imaged characteristics information comprises a facial recognition information, a sex information, an age group information, a body type information and/or information on clothing worn by the user;

based on the imaged characteristics information of the user being obtained, identifying whether first information corresponding to the imaged characteristics information is stored in the electronic apparatus as identification information;

based on the corresponding first information not being stored in the electronic apparatus as identification information, generating identification information corresponding to the imaged characteristics information of the user;

mapping and storing the imaged characteristics information and the identification information of the user;

identifying whether a second electronic apparatus is located in a same place as the electronic apparatus, based on the second electronic apparatus being located in the same place as the electronic apparatus, transmitting a first form of data including the imaged characteristics information, the identification information of the user and information related to at least one of the services requested by the user to the second electronic apparatus, based on the second electronic apparatus being located in a different place as the electronic apparatus, transmitting second information excluding the facial recognition information from among the imaged characteristics information to the second electronic apparatus, and transmitting the information related to the at least one of the requested services to the second electronic apparatus, identifying whether a server is located in the same place as the electronic apparatus, based on the server being located in the same place as the electronic apparatus, transmitting the first form of data to the server, based on the server being located in the different place as the electronic apparatus, transmitting the second information to the server, and transmitting the information related to the at least one of the services to the server, wherein of the electronic apparatus and the second electronic apparatus performs the at least one of the requested services provided to the user based on the information related to the at least one of the requested services, wherein the method further comprises:

receiving, from the server, service information presented to the user based on the identification information of the user;

receiving a user input to the service information, and in response to the user input for the service information, present additional service information to the user, the additional service information being related to the user input response to the service information, and receiving a second user input to the additional service information, and transmitting, to the server, a request to update the additional service information with respect to the service information based on the second user input and the identification information of the user.

11. The control method of claim 10, the method further comprising:

based on the corresponding first information being stored in the electronic apparatus, obtaining the identification information of the user mapped in the corresponding first information from the electronic apparatus; and performing the at least one of the requested services based on the obtained identification information.

12. The control method of claim 10, the method further comprising:

based on the at least one of the requested services being performed, transmitting the information related to the at least one of the requested services performed to the user and the imaged characteristics information, to the second electronic apparatus through a peer to peer (P2P) communication.

13. The control method of claim 10, the method further comprising:

receiving from the second electronic apparatus the imaged characteristics information and the identification information of the user; and storing the imaged characteristics information and the identification information.

14. The control method of claim 10, the method further comprising:

based on respective characteristics information of a plurality of users being obtained from the image, generating respective identification information corresponding to each of the respective characteristics information of the plurality of users;

generating group identification information by grouping a plurality of identification information;

generating group characteristics information based on at least one of the respective characteristics information of the plurality of users; and transmitting the respective identification information of each of the plurality of users, the respective characteristics information, the group identification information, and the group characteristics information to the second electronic apparatus.

* * * * *